July 20, 1954
E. P. LAMB
2,684,204
VEHICLE FRESH-AIR HEATING SYSTEM
Filed March 4, 1950
2 Sheets-Sheet 1
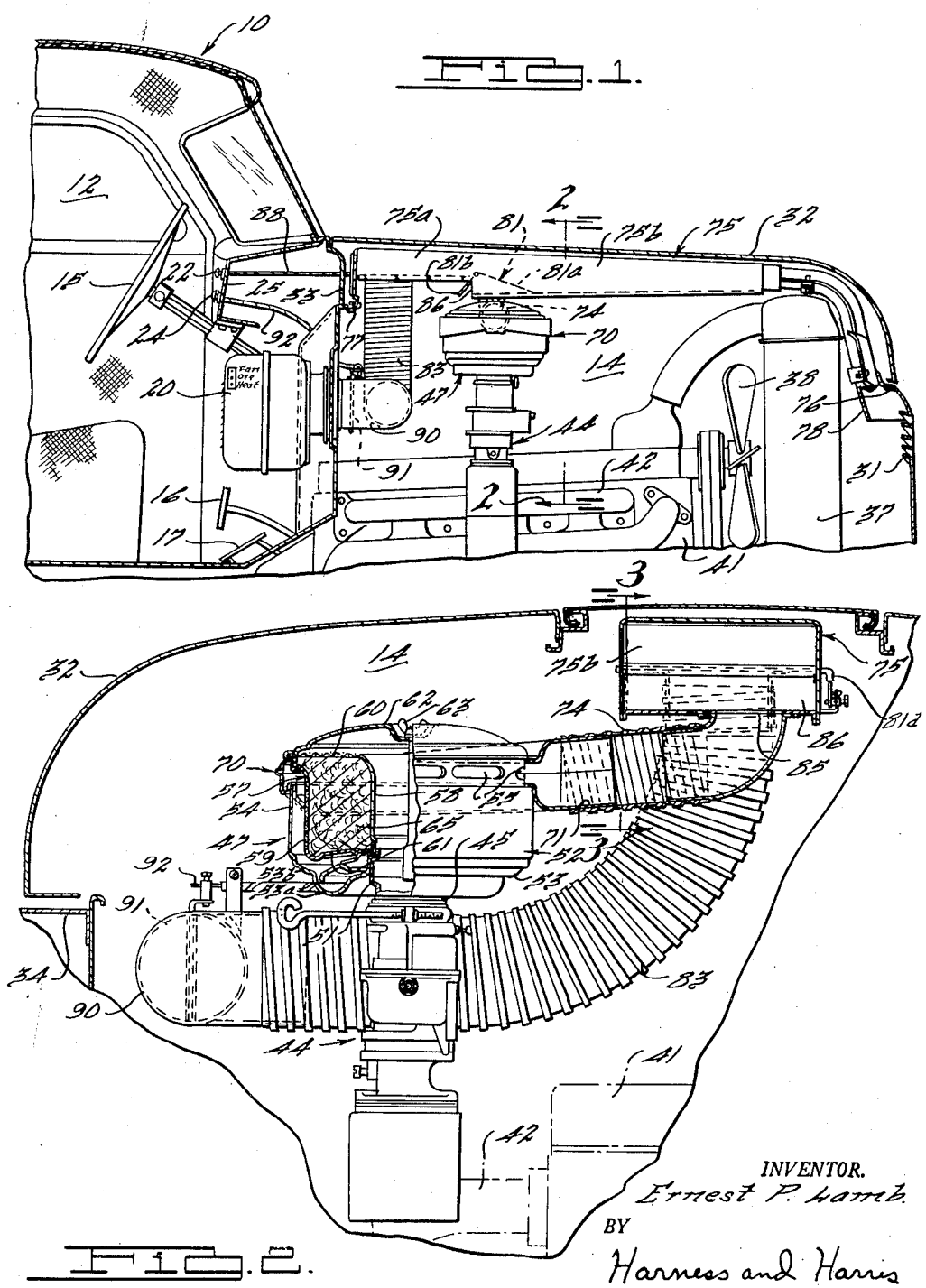
INVENTOR.
Ernest P. Lamb.
BY
Harness and Harris
ATTORNEYS.

July 20, 1954 E. P. LAMB 2,684,204
VEHICLE FRESH-AIR HEATING SYSTEM
Filed March 4, 1950 2 Sheets-Sheet 2
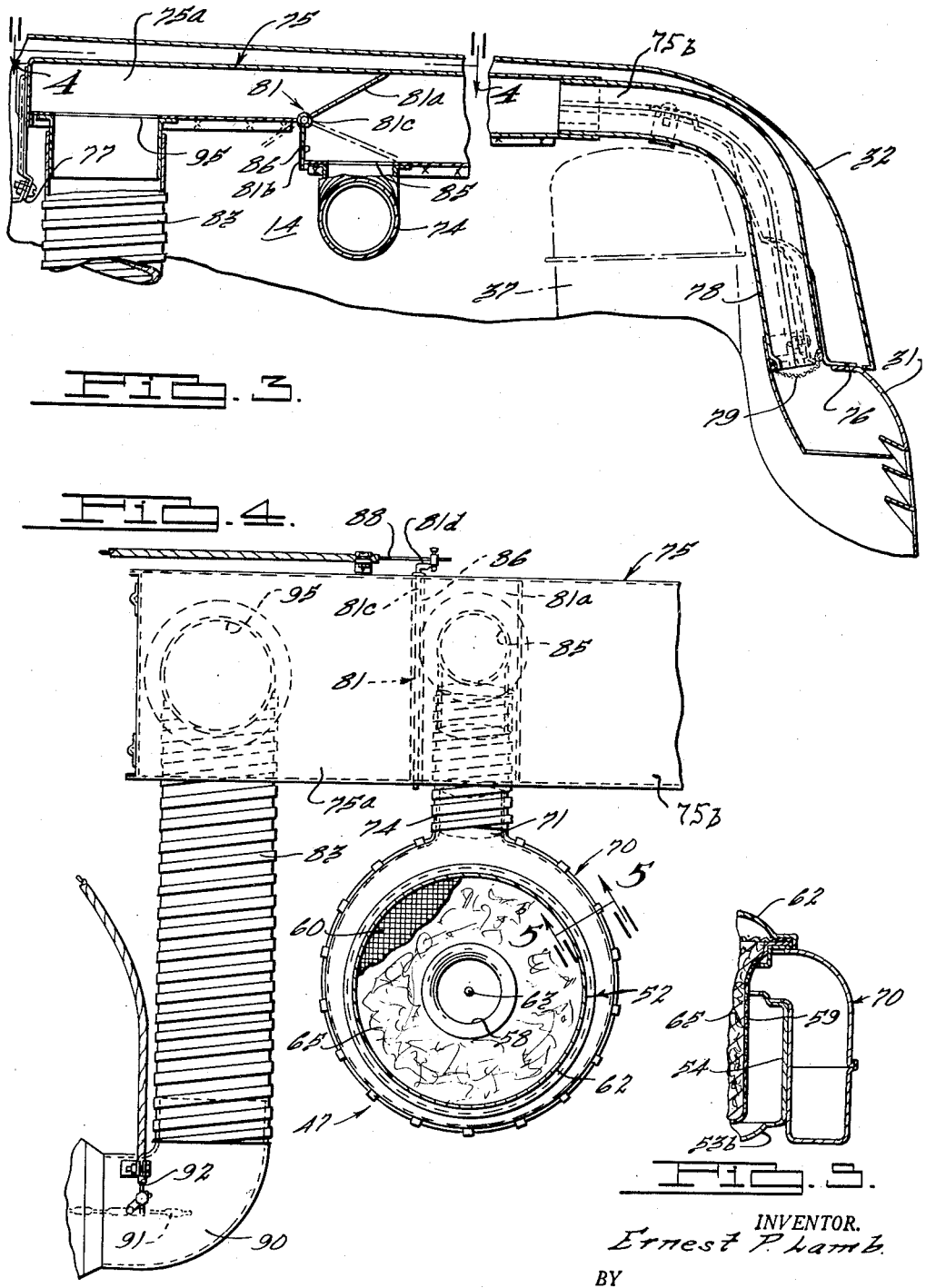
INVENTOR.
Ernest P. Lamb.
BY
Harness and Harris
ATTORNEYS.

Patented July 20, 1954

2,684,204

UNITED STATES PATENT OFFICE 2,684,204

VEHICLE FRESH-AIR HEATING SYSTEM

Ernest P. Lamb, Grosse Pointe, Mich., assignor to Chrysler Corporation, Highland Park, Mich., a corporation of Delaware Application March 4, 1950, Serial No. 147,587

8 Claims. (Cl. 237—12.3)

This invention relates to fresh air heater systems for the interiors of motor vehicles provided with an internal combustion engine having a carbureted fuel supply and particularly to novel structure for selectively delivering fresh air to the carburetor of the engine and to the heating elements of the fresh air heating system.

It is an accepted fact that the power output of an internal combustion engine having a carbureted fuel supply is directly proportional to the density of the air supplied with the fuel mixture. As the density of the air supply is inversely proportional to the temperature thereof it naturally follows that the cooler the air supplied to the carburetor the higher the engine power output for a given amount of fuel passing therethrough.

It is conventional to force fresh air from outside the vehicle through the heating system conduits and heating elements to the interior of the vehicle. It is likewise conventional to supply the engine carburetor with air drawn from within the engine compartment of the vehicle. As the air supplied to the carburetor from the engine compartment is usually heated due to its passage across and around heated parts of the operating engine, it is obvious that the maximum power output cannot be obtained when the less dense heated air from the engine compartment is supplied to the carburetor for mixture with the fuel passing therethrough.

It is a primary object of this invention to provide a fresh air heating system wherein the heater fresh air supply conduits serve a dual function of providing fresh air for the heater and also directing cool fresh air to the engine carburetor air inlet.

It is a further object of this invention to provide an air supply system for a carburetor with means for varying the temperature of the air passed therethrough.

It is another object of this invention to provide an air supply system for a carburetor that will force cool dense air through the carburetor and thereby improve the engine power output.

It is another object of this invention to provide an improved, simplified form of fresh air heater system with improved control means therefor.

It is still another object of this invention to provide a fresh air heater system for a motor vehicle that is so associated with the engine of the motor vehicle that the efficiency of operation of the engine may be improved.

It is a further object of this invention to provide a fresh air heater system for a motor vehicle that has the air supply means thereof connected to the air supply for the engine carburetor and valve means associated therewith to selectively vary the amount and temperature of the air delivered to the heater and the carburetor.

It is an additional object of this invention to provide an improved type of heating and ventilating system for a motor vehicle.

Other objects and advantages of this invention will become apparent from a reading of the following specification and a consideration of the related drawings wherein:

Fig. 1 is a side elevation of the forward portion of a motor vehicle with portions of the body broken away to more clearly disclose the structure associated with this invention;

Fig. 2 is a fragmentary sectional elevational view taken along the line 2—2 of Fig. 1, portions of the carburetor air cleaner being broken away to clearly disclose its construction;

Fig. 3 is a fragmentary sectional elevational view taken along the line 3—3 of Fig. 2 disclosing the heater air intake duct and associated parts;

Fig. 4 is a fragmentary sectional elevational view taken along the line 4—4 of Fig. 3, portions of the carburetor air cleaner being broken away to more clearly disclose the structure thereof; and Fig. 5 is a fragmentary sectional elevational view taken along the line 5—5 of Fig. 4 disclosing the shape of the air cleaner shroud.

Fig. 1 of the drawings shows the forward portion of a motor vehicle which is generally denoted by the reference numeral 10. The motor vehicle 10 includes the body interior or cab portion 12 and the engine compartment 14.

Mounted within the vehicle interior or cab portion 12 are the conventional vehicle controls such as the steering wheel 15, the clutch and/or the brake pedal 16, the engine carburetor accelerator pedal 17, as well as the other conventional controls not shown. Also mounted within the cab or load carrying portion 12 is a fresh air heater 20 that is preferably of the hot water heating type although heaters of other types may also be used in combination with the invention herein disclosed. Heater 20 is mounted on the forward wall 33 of cab portion 12 in a conventional manner. Heater 20 has associated therewith the two air supply valve controls 22 and 24 respectively which will be more fully described hereinafter. These controls 22 and 24 are preferably mounted on the cab dashboard 25 within convenient reach of the vehicle operator. The heater 20 preferably has windshield defrosting equipment associated therewith but as such equipment is not directly related to this invention, it has been omitted for the sake of clarity.

The engine compartment 14 is defined by the front, louvered radiator grill 31, the hood 32, the cab wall 33 and the vehicle fenders 34. The hood 32 is pivotally mounted adjacent its rear end portion (by means not shown) on the forward wall 33 of the cab portion 12. Conventional vehicle fenders 34, a portion of one being shown in Fig. 2 close the sides of the vehicle compartment 14 and form supports for the side edges of the hood 32 when it is in its lowered, closed position.

Mounted within the engine compartment 14 is a fluid circulating engine radiator cooling unit 37 for the conventional spark ignition type of internal combustion engine 41 that utilizes carbureted fuel. Engine 41 includes the fuel intake manifold 42 and has associated therewith a down-draft type of carburetor which is generally designated by the numeral 44. Carburetor 44 includes the vertically extending, tubular, air intake throat portion that has mounted thereon the air cleaner 47.

Air cleaner 47 includes a vertically extending, centrally positioned tubular portion 51 that supports a concentrically arranged, cup-shaped outer casing member 52. Casing 52 includes a substantially horizontally extending bottom wall portion 53 having depressions 53a pressed therein and a vertically extending side wall portion 54 that has circumferentially extending window-like openings 55 adjacent its upper edge. Positioned within the casing 52 is a ring-like filter housing 57. Housing 57 comprises the spaced inner and outer vertically extending, concentrically arranged walls 58 and 59 respectively, which are connected at their upper and lower ends by perforated plates 60 and 61 respectively. Mounted within the filter housing 57 is a filter element 65 of steel wool, fibre glass, coated hair, or some similar material. Covering the top of air cleaner 47 is a dome-like top 62 that is detachably connected to the casing 52 by the wing-nut and bolt connecting means 63.

The lower portion of casing 52 is normally filled with oil or the like up to the level indicated by the numeral 53b. Air passing through the window-like openings 55 in casing 52 passes downwardly between spaced vertical walls 54 and 59, strikes the upper surface of the oil in the bottom of casing 52 and rebounds upwardly through the lower perforated plate 61, the filter material 65, and the upper perforated plate 60. After passing through upper plate 60, the closed cover 62 of the casing 52 deflects the cleaned air downwardly through the tubular-like inner wall element 58 and into the throat 51 of the carburetor 44. Thereafter the cleaned air is mixed with the fuel in the carburetor 44 and the fuel and air mixture is delivered to the engine intake manifold 42.

It will be noted that the upper portion of vertical wall 54 of the air cleaner 47, adjacent the openings 55, is surrounded by a circular shroud element 70 of channel-shaped cross-sectional configuration. From Fig. 4 it will be noted that the shroud 70 is eccentrically positioned with respect to the air cleaner 47. Also from Fig. 2 it will be noted that the height or thickness of the shroud element 70 has a decreasing taper from its mouth or inlet portion 71 to a point disposed diametrically opposite the shroud mouth 71. This particular arrangement insures a substantially constant velocity air flow to all of the window-like openings 55 in the air cleaner casing 52.

The mouth portion 71 of shroud 70 is connected by suitable flexible tubing 74 to the fresh air intake duct or conduit 75. Conduit 75 is of rectangular cross-sectional configuration and extends lengthwise of the engine compartment 14 at the upper portion thereof immediately beneath the hood 32. Conduit 75 is supported at its forward end by the radiator grille 31 as shown at 76 and at its rear end by the cab wall 33 as shown at 77. The forward portion 75b of conduit 75 is curved downwardly at 78 so as to provide an air gathering scoop portion that is positioned behind the louvered radiator grille 31. Conduit portion 78 has a dust filtering screen 79 positioned across its mouth to remove dust and other foreign matter that might pass through the louver openings in grille 31 and enter the mouth of conduit portion 78. It is thought to be obvious that as the vehicle 10 moves forwardly that cool fresh air from in front of the vehicle will be forced through the conduit 75 from the front to the rear thereof. Even when the vehicle is standing still with the engine idling still there will be a rearwardly directed flow of cool fresh air through the louvered grille 31 and the conduit 75 due to the engine driven cooling fan 38 pulling air through the radiator grille 31 and across the radiator 37.

Intermediate the front and rear end portions 75b and 75a respectively of the conduit 75 there is mounted a rotatable, substantially L-shaped, butterfly valve 81. The valve 81 includes the angularly disposed valve flaps 81a and 81b which are connected by the valve pivot portion 81c. Valve flap 81a is adapted to control the admission of fresh air to the rear portion 75a of the conduit 75. Portion 75a of conduit 75 has a port 85 therein that connects the conduit 75 to the flexible tubing 83. Tubing 83 transmits air from the conduit 75 to the inlet pipe 90 of the heater 20 so that the cool air in conduit 75 can pass across the heater elements of the cab heater 20 and through the heater 20 to the interior 12 of the vehicle 10. Valve flap 81a also controls the admission of fresh air to the port 85 that is connected to the air cleaner shroud 70 by the flexible tubing 74.

From the description so far of valve 81 it is thought to be obvious that when valve flap 81a is in the raised or upper position, as shown in full lines in Fig. 3, that cool fresh air entering the mouth 78 of the duct 75 through the radiator grill 31 will be directed downwardly through port 85 and into the carburetor 44 through the tubing 74, shroud 70, air cleaner 47 and carburetor throat portion 51. When valve flap 81a is raised to the position shown in full lines in Fig. 3, it blocks off the flow of fresh air to the heater 20 through the conduit portion 75a and tubing 83. When valve flap 81a is lowered to the position shown in broken lines in Fig. 3, then it opens up conduit portion 75a to the fresh air entering the forward or mouth portion 78 of conduit 75 and directs fresh air through the heater 20. At the same time lowering of valve flap 81a to the position shown in broken lines in Fig. 3 will close off the port 85 to the fresh air supply and then cool fresh air will not be delivered to the carburetor through the tubing 74, shroud 70 and air cleaner 47. It will thus be seen that valve flap 81a is arranged to alternately control the fresh air supply to two independent devices, namely the heater 20 and the carburetor 44.

When valve flap 81a is in its lowered position as shown by the broken lines in Fig. 3, then the fresh air supply to the carburetor is cut off and some means must be provided to supply air to the air cleaner 47 and carburetor 44. This means consists of the valve flap 81b that is integral with valve flap 81a and accordingly moved simultaneously therewith. When valve flap 81a is moved clockwise to its lowered brokenline position in Fig. 3, then valve flap 81b is rotated clockwise to the position shown in broken lines and this uncovers the opening or port 86 in conduit 75 and connects the air cleaner 47 to the interior of the engine compartment 14 through the ports 86 and 85 and the flexible tubing 74. Obviously when valve 81 is in the latter described position then cool fresh air is being forced through the conduit 75 to the heater 20 and heated air from within the engine compartment 14 is being drawn into the carburetor 44.

To control the movement of valve 81 the valve pivot pin 81d (see Fig. 4), which is fixed to valve portion 81c, has an arm portion thereof connected by a flexible cable 88 to the valve control 22 that is mounted within the vehicle interior 12. To provide a further control for the air passed through heater 20 there is pivotally mounted in the pipe-like inlet 90 to heater 20 a butterfly control valve 91. Control valve 91 is adapted to be rotated by movement of the flexible cable 92. Cable 92 is connected to the valve control 24 that is mounted in the vehicle interior 12. The valve 91 provides for control of the air passing through the heater 20 independently of the condition of the valve 81. It is thought to be clear that the valves 81 and 91 can be opened to varying degrees between their extreme positions to provide variable mixtures of hot and cold air to the carburetor 44 and the vehicle interior 12.

The combination heater and carburetor air supply system herein disclosed provides a means for utilizing a single air duct system for a plurality of purposes that are directly associated with one another. Not only is an improved power output obtainable with this system but in addition the heating system is controlled in a manner that is most comfortable and beneficial to the occupants of the vehicle interior. For instance when the vehicle is being operated in the summer when the outside temperatures are relatively high obviously the heater is not in use and the valve 81 will be moved to position shown in full lines in Fig. 3. At this time the cool outside air will be delivered by forced draft to the carburetor and this modified supercharge of cool dense air insures maximum power output for the engine 41. It is obvious that the extremely warm air around the carburetor 44 in the engine compartment 14 should not be admitted to the carburetor if maximum power output is to be obtained. However, with conventional carburetor assemblies such is the case. In contrast it will be noted that the closed valve flap 81b prevents any of the warm engine compartment air from entering the carburetor when the valve 81 is in the position shown in full lines in Fig. 3.

In winter operation when the heater is to be used and fresh air is to be passed through the conduit 75 and tubing 83 to the heater inlet 90, the valve 81 will be adjusted to the position shown in broken lines in Fig. 3. In such a position the cold fresh air is directed to the heater and after warming is passed to the cab interior 12. The fresh air supply to the cab interior 12 gives clean fresh air to the occupants and prevents fogging of the windows. At this time the cold fresh air entering conduit 75 is prevented from reaching the carburetor 44 by the lowered valve flap 81a. Valve flap 81b is raised at this time so that the relatively warm air from the engine compartment 14 is passsed through the air cleaner 47 to the carburetor 44. This is advantageous for the warm air admitted to the carburetor in the winter insures quick easy starting whereas cold fresh air would not be particularly advantageous during cold weather starting. After the engine has been operating a while and the interior 12 of the cab has been completely warmed up, then the valve control 22 can be operated to reduce the amount of fresh air passing to the heater and to increase the amount of cool dense air fed to the carburetor. Thus even in winter when the heater is in use, still an improved engine power output can be obtained by proper operation of the valve controls of this heater system. On cold weather starting with the valve 81 in its lowered (broken line, Fig. 3) position it is possible to prevent the admission of air to the cab interior 12 until after the heater has been sufficiently warmed up by closing the valve 91.

The heating system herein disclosed can also be used to ventilate the cab interior 12 for the valve 81 may be adjusted to direct cool fresh air into both the carburetor 44 and the heater 20. Heater 20 is conventional and includes both a fan control and a heat control. When the heater 20 is used for ventilation purposes the heater fan control only is closed to force cool fresh outside air to the cab interior 12. The several controls for the heater 20 are preferably located either on the cab dashboard 25 or on the heater 20 so that they are within convenient reach of the vehicle operator.

Although I have shown the duct 75 receiving fresh air through the radiator grill 31 of the vehicle, the fresh air may be received from any convenient location on the vehicle without departing from the scope of this invention. Similarly, the air cleaner 47 may be mounted at some other location within the engine compartment so long as it is directly connected to the carburetor intake throat 51.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a motor vehicle having a load carrying compartment and an engine compartment, an air heater unit mounted on said vehicle adapted to deliver heated air to the load carrying compartment, an engine mounted in said engine compartment having a carburetor fuel mixture air inlet located within said engine compartment, a first air conduit means extending from said heater unit through portions of said engine compartment to the exterior of said vehicle, a second conduit means connected between said engine carburetor fuel mixture air inlet and the portions of said first conduit means within said engine compartment, and a valve associated with said first conduit means to selectively control the admission of air to said heater unit and to said engine carburetor fuel mixture air inlet from the exterior of the vehicle, said first air conduit means being adapted to serve the dual purpose of providing cool fresh air for both the heater unit and the fuel mixture air inlet.

2. In a motor vehicle having a load carrying compartment and an engine compartment, an air heater unit mounted on said vehicle adapted to deliver heated air to the load carrying compartment, an engine mounted in said engine compartment having a carburetor fuel mixture air inlet located wtihin said engine compartment, a first air conduit means extending from said heater unit through portions of said engine compartment to the exterior of said vehicle, a second conduit means connected between said engine carburetor fuel mixture air inlet and the portions of said first conduit means within said engine compartment, and a valve associated with said first conduit means to selectively control the admission of air to said heater unit and to said engine carburetor fuel mixture air inlet from the exterior of the vehicle, said valve being arranged to automatically admit air from the engine compartment to said engine carburetor fuel mixture air inlet when air from the exterior of the vehicle is being delivered to said heater unit, said first air conduit means being adapted to serve the dual purpose of providing cool fresh air for both the heater unit and the fuel mixture air inlet.

3. In a motor vehicle having a load carrying compartment and an engine compartment, an air heater unit mounted on said vehicle adapted to deliver heated air to the load carrying compartment, an engine mounted in said engine compartment having a carburetor fuel mixture air inlet located within said engine compartment, a first air conduit means extending from said heater unit through portions of said engine compartment to the exterior of said vehicle, a second conduit means connected between said engine carburetor fuel mixture air inlet and portions of said first conduit means within said engine compartment, a first valve associated with said first conduit means to selectively control the admission of air to said heater unit and to said engine carburetor fuel mixture air inlet from the exterior of the vehicle, and a second valve associated with said first conduit means to control the passage of air through said heater unit, said first air conduit means being adapted to serve the dual purpose of providing cool fresh air for both the heater unit and the fuel mixture air inlet.

4. In a motor vehicle having a load carrying compartment and an engine compartment, an air circulating and heating unit mounted on said vehicle adapted to deliver air to the load carrying compartment in a heated or unheated condition, an engine mounted in said engine compartment having a fuel mixture air inlet, an air conduit means extending from said heater unit through portions of said engine compartment to a source of fresh, relatively cool air, a branch conduit connected between and communicatively connecting said engine fuel mixture air inlet and said conduit means, and an air selector mechanism associated with said conduit means to selectively control the admission of air to said heater and to said engine fuel mixture air inlet from said source of fresh, relatively cool air, said air selector mechanism including means to automatically admit air from said engine compartment to said engine fuel mixture air inlet when said selector mechanism is arranged for the delivery of fresh air to said air circulating and heating unit, said air conduit serving the dual purpose of providing fresh air for the heating unit and the fuel mixture air inlet.

5. In a motor vehicle having a load carrying compartment and an engine compartment, an air heater unit mounted in and adapted to deliver heated air to the load carrying compartment, an engine mounted in said engine compartment having a carburetor with a fuel mixture air inlet thereto, a first air conduit means extending from said heater unit through portions of said engine compartment to the exterior of said vehicle, a second conduit means communicatively connected between said engine fuel mixture air inlet and portions of said first conduit means within said engine compartment, and a butterfly valve unit rotatably mounted in a portion of said first conduit means located in said engine compartment to selectively control the admission of air to said heater unit and to said engine fuel mixture air inlet from the exterior of the vehicle, said valve having a pair of angularly disposed flaps, one of which is adapted to selectively control the passage of air from the exterior of said vehicle through said first conduit to said heater unit and to said second conduit, the other flap being arranged to control the admission of air to said second conduit from said engine compartment, said first air conduit means being adapted to serve the dual purpose of providing cool fresh air for both the heater unit and the fuel mixture air inlet.

6. In a motor vehicle having a passenger compartment and an engine compartment, an air heater unit mounted on said vehicle and adapted to deliver heated air to said passenger compartment, an internal combustion engine mounted within said engine compartment, said engine having a fuel mixture air inlet located within said engine compartment, conduit means for supplying air to said heater unit from the exterior of said vehicle, said conduit means also including branch conduit means for supplying air from the exterior of said vehicle to said engine fuel mixture air inlet, and a single valve means associated with portions of said conduit means and said branch conduit means located within said engine compartment adapted to selectively control the amount of air admitted to said engine fuel mixture air inlet and to said heater unit from the exterior of the vehicle, said valve means having portions that automatically admit air from the engine compartment to the engine fuel mixture air inlet when air from the exterior of the vehicle is passed through said conduit to said heater unit, said conduit means serving a dual function of supplying fresh air to the heater unit and the fuel mixture air inlet.

7. In a heating and ventilating apparatus for a motor vehicle having a passenger compartment and an engine compartment, an air heating and circulating unit mounted in said passenger compartment adapted to deliver fresh air to said passenger compartment in a heated or unheated condition, an internal combustion engine mounted in said engine compartment provided with a carbureted fuel supply system including a fuel mixture air inlet, a first conduit extending through portions of said engine compartment communicatively connecting said air heating and circulating unit to the exterior of said vehicle, a second branch conduit communicatively connected between said first conduit and said engine fuel mixture air inlet, and a valve movably mounted in one of said conduits adapted to selectively or simultaneously direct air from the exterior of said vehicle to said heating and air circulating unit and to said engine fuel mixture air inlet, said first conduit providing fresh air for supply to both the heating and ventilating unit and for supply to the fuel mixture air inlet.

3. In a heating and ventilating apparatus for a motor vehicle having a passenger compartment and an engine compartment, an air heating and circulating unit mounted in said passenger compartment adapted to deliver air to said passenger compartment in a heated or unheated condition, an internal combustion engine mounted in said engine compartment provided with a carbureted fuel supply system including a fuel mixture air inlet, a first conduit extending through portions of said engine compartment communicatively connecting said air heating and circulating unit to the exterior of said vehicle, a second branch conduit communicatively connected between said first conduit and said engine fuel mixture air inlet, and a valve movably mounted in one of said conduits adapted to selectively or simultaneously direct air from the exterior of said vehicle to said heating and air circulating unit and to said engine fuel mixture air inlet, said valve having portions thereof movably associated with portions of said branch conduit to automatically admit air from said engine compartment to said branch conduit when air from the exterior of said vehicle is being directed to said air heating and circulating unit, said first conduit providing fresh air for supply to both the heating and ventilating unit and for supply to the fuel mixture air inlet.

References Cited in the file of this patent

UNITED STATES PATENTS

| Number | Name | Date |
|---|---|---|
| 1,903,653 | Brock | Apr. 11, 1933 |
| 1,957,919 | Tice | May 8, 1934 |
| 2,119,402 | Puffer | May 31, 1938 |
| 2,240,062 | Welch | Apr. 29, 1941 |
| 2,396,317 | Cutts | Mar. 12, 1946 |